United States Patent [19]

Thelen et al.

[11] Patent Number: 4,659,266

[45] Date of Patent: Apr. 21, 1987

[54] WHEEL CHOCKING ASSEMBLY

[75] Inventors: Gerhard A. Thelen, St. David; Yan H. Tse, Plymouth Meeting; Wayne H. Murphy, Pottstown, all of Pa.

[73] Assignee: Consolidated Rail Corporation, Philadelphia, Pa.

[21] Appl. No.: 819,880

[22] Filed: Jan. 16, 1986

[51] Int. Cl.$^4$ ............................ B60T 3/00; B60P 3/07; B60P 7/08
[52] U.S. Cl. ........................................ 410/10; 410/19; 410/30
[58] Field of Search .......................... 410/3, 4, 7, 9, 10, 410/11, 19, 20, 21, 25, 26, 29, 30, 36, 37, 42, 47-50, 8, 12; 188/32, 36; 248/172, 352, 499

[56] References Cited

U.S. PATENT DOCUMENTS

| 2,055,829 | 9/1936  | Tobin          | 410/20   |
| 2,316,178 | 4/1943  | Morgensen, Jr. | 188/32   |
| 2,858,905 | 11/1958 | Fahland        | 410/30   |
| 2,936,992 | 5/1960  | Browning       | 248/499  |
| 3,564,577 | 1/1971  | Blunden et al. | 410/12   |
| 3,655,014 | 4/1972  | Nyborg         | 188/32   |
| 3,685,856 | 8/1972  | Blunden        | 410/26 X |
| 3,866,542 | 2/1975  | Blunden        | 410/8    |
| 4,343,401 | 8/1982  | Paulyson       | 410/11 X |
| 4,479,746 | 10/1984 | Huber          | 410/21   |

FOREIGN PATENT DOCUMENTS

| 0128992 | 12/1984 | European Pat. Off. | 410/12 |
| 3113707 | 10/1982 | Fed. Rep. of Germany . | |
| 1027701 | 5/1953  | France | 410/20 |
| 1094650 | 5/1955  | France | 410/4  |
| 1469877 | 2/1967  | France | 188/32 |
| 0703585 | 2/1954  | United Kingdom | 410/30 |

Primary Examiner—Robert B. Reeves
Assistant Examiner—Scott H. Werny
Attorney, Agent, or Firm—Woodcock Washburn Kurtz Mackiewicz & Norris

[57] ABSTRACT

A wheel chocking assembly that is especially suitable for securing a wide variety of automobiles to the deck of a railroad car includes a polyester strap member adapted to conform to the shape and extending over the top of an automobile's tire which is coupled to a pair of chock members formed as collapsible wedges and positioned in front of and behind the wheel. In one embodiment, the wedges are rotatably coupled to a pair of channels extending the length of the railroad car, and are collapsible for positioning of the automobiles during loading. Another embodiment utilizes a pair of wedges which are adjustably mounted in a telescopic fashion to frames extending inward from a channel attached to the deck of the railroad car at its sides, the channels being adapted to permit the frames to be swung up and out of the way during loading and unloading operations.

9 Claims, 14 Drawing Figures

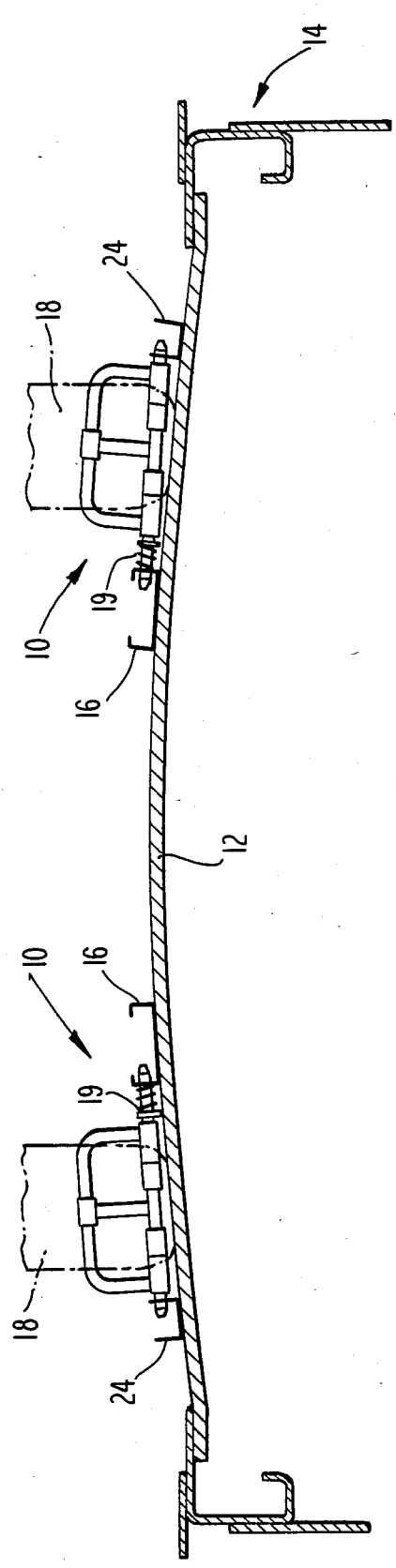
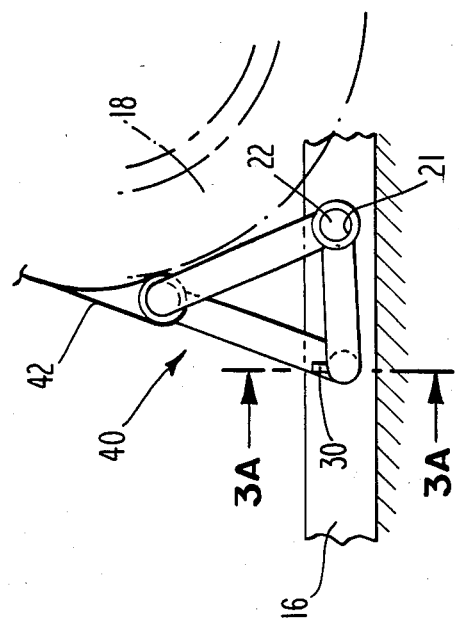
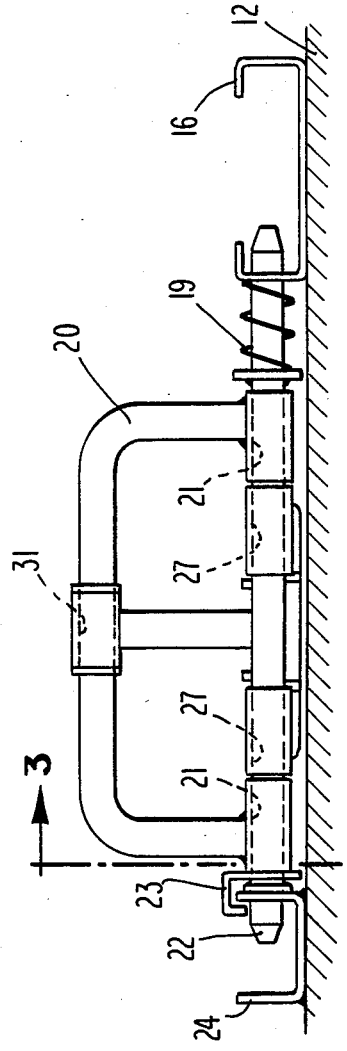
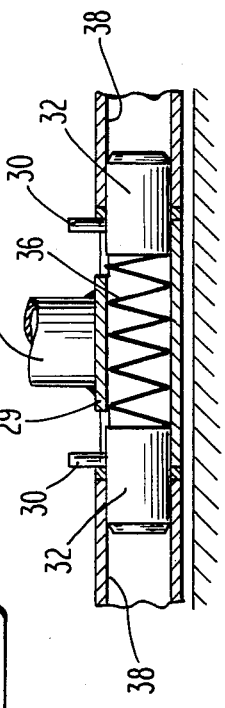

WHEEL CHOCKING ASSEMBLY

BACKGROUND OF THE INVENTION

This invention relates generally to apparatus used for immobilizing a vehicle under transport, and more particularly to a wheel chocking assembly that is especially suitable for securing a wide variety of automobiles to the deck of a railroad car.

Newly manufactured automobiles are often shipped over long distances in large numbers aboard specially adapted railroad cars. The railroad cars, typically having two and three decks, are coupled together and loaded or unloaded in long lines. Loading ramps are then connected at one end of the line with bridge-type ramps connecting the respective decks between cars. The automobiles are subsequently driven aboard the railroad cars, at speeds which often approach twenty miles per hour, and loaded front to back, top to bottom with overhead and bumper-to-bumper clearances rarely exceeding three inches. Ideally, the automobiles arrive at their destination free from defect and ready for sale. As is more often the case, however, they are damaged in transit for a variety of reasons.

Automobiles, like all other freight which is shipped by rail, are subjected to many interactive forces. One such set of forces is caused by slack that is necessarily left when coupling railroad cars to compensate for sags and dips and cresting in the track. These forces, referred to as "buff" and "draft", describe respectively the compressive and tensile coupling forces which cause a jerky relative movement between the cars known as "run-in" and "run-out". Another fundamental problem, "rock and roll", occurs because of uneven or rough track, bridges, and grade crossings which set up a resonant rocking condition while the train is in motion. For a detailed discussion of these and other forces such as yard impacts which have necessitated various protective measures as described herein below, see *Track Train Dynamics: To Improve Freight Train Performance* (2d Ed.), Report R-185 of the Association of American Railroads, the contents of which is incorporated herein by reference.

One of the earliest methods used to secure an automobile to the deck of a transport such as a railroad car was to forcibly restrain each of the automobile's four corners to some means, such as parallel channels, extending along the length of the transport deck. See, for example, U.S. Pat. No. 3,685,856 (Blunden) which teaches a vehicle tie-down for haul-away trailers. One major drawback to such methods, nevertheless, was their inability to accommodate varying sizes of automobiles. That is, different makes and styles of automobiles required different lengths of chains and different means for attaching those chains to the automobiles. A more adaptable system was, therefore, desirable. Another problem associated with such methods was the fact that the parallel channels situated along the length of the railroad car deck and to which the tie-down chains are attached form an obstruction to the entry and exit of automobiles. A system which eliminated such channels would, of course, be desirable.

Various improvements to the above-described apparatus, such as those taught by U.S. Pat. No. 3,564,577 - Blunden et al and U.S. Pat. No. 3,866,542 - Blunden, provided carriage means or shoes which were slidably mounted within the channels extending lengthwise of the railroad car, thus yielding some measure of adaptability in securing various sizes of automobiles. Like the simple four-chain method, however, the methods employing such apparatus still subjected the transported automobiles directly to high "G" forces induced by buff and draft, rock and roll, and yard impacts. As a result, automobile manufacturers in order to protect their product had to reinforce the automobile's frame to withstand higher "G" forces than is typically encountered on the highway, and further had to install padeyes, hooks, or other such fixtures upon which the above described apparatus were attached.

In an attempt to alleviate such automobile design problems, it was next proposed to secure the automobile to the transport vehicle by the automobile's tires rather than by its frame, thus advantageously utilizing the automobile's suspension system to absorb the shocks and vibrations of typical railroad operations. One system used straps, either wire cables or woven belts, which would be secured at one end to the of the transport vehicle deck in front of the tire, lead up and over the top of the tire, and secured by its other end to the deck of the transport vehicle behind the tire. Such systems, while typically deployed only over the tires along one side of the automobile to preclude having to crawl in and out of the automobile, successfully prevented movement of the automobile in a vertical direction. They were unsuccessful, however, in preventing lateral and longitudinal displacements.

A number of alternative methods were proposed which utilized chocks, both alone and in combination with the straps. Chocks are wedge-shaped apparatus placed immediately in front of and behind a tire to prevent it from moving forward and backward. Chocks used alone were somewhat successful in spite of the often awkward nature of their deployment. Systems which utilized chocks in combination with straps were typically more successful than those using chocks alone, as could be expected. However, in several cases during impact tests simulating railroad car coupling operations, such combination systems either did not prevent the automobile's tires from "climbing" their chocks or were jammed by car movement thus precluding the chock's removal. Moreover, as in each of the above-described prior art methods and apparatus, the chock and strap combination still relied upon some guide or channel means which was permanently affixed to the deck of the railroad car, thereby precluding the attainment of an obstruction-free railroad car deck.

The goal of a clear deck was highly preferable from the standpoint of the automobile manufacturers. An obstruction-free deck would not only promote the economically rapid loading and unloading of automobiles onto railroad cars, but also would prevent tire and underbody damage, particularly to the automobile's oil pan and exhaust system.

While directed to a support kit for loading the carrying automobiles as cargo in a standardized, enclosed dry-freight intermodal shipping container, U.S. Pat. No. 4,343,401 - Paulyson teaches a double-decked arrangement which meets some of the above objectives. Automobiles are driven onto the upper or track deck and tied down against vertical or longitudinal movement on the tracks by nylon take-up straps extending cross-wise from points of attachment on the bottoms of the automobiles to sidepost mounting tracks. On the container floor, automobiles are secured against longitudinal and lateral movement by specially adapted wheel chocking plates which are mounted as part of the kit to telescoping crossbeams which extend from the conventional sideposts. As can be readily appreciated, however, the Paulyson kit still requires automobile manufacturers to install eyebolts as points of attachment for the nylon take-up straps. Moreover, while requiring no tools for its assembly, the kit is comprised of numerous parts which involve complex and time-consuming assembling. Still further with the system disclosed by Paulyson, the automobile is restrained by the frame rather than by its tires. As mentioned above, it is desirable to restrain the automobile with its tires because of the additional cushioning provided by the automobile's own suspension system.

One typical approach for freeing up the deck of a transport from obstructions which would be potentially hazardous to automobiles during loading and unloading is disclosed in a German Pat. No. DE 31 13707 Al - Schmidt et al. As taught therein, a chock comprsied of a triangular frame is hinged to a vehicle loading track such that it may be lifted out of the way for loading and unloading. The frame must still be fitted to the vehicle by bolts, thereby necessitating tools and additional design on the part of the automobile manufacturer.

Accordingly, it is a general object of the present invention to provide an apparatus for securing an automobile to the deck of a transport in a simple yet effective manner. More specifically, it is an object of this invention to provide a wheel chocking assembly that is especially suitable for securing a wide variety of automobiles to the deck of a railroad car.

Another object of the invention is to provide a wheel chocking assembly that is easily readied with no tools, readily stowed during loading and unloading operations, and quickly adapted to various lengths and widths of automobiles.

Still another object of the present invention is to provide a wheel chocking assembly which maximizes the vertical clearance between the deck of the railroad car and the underbody of the automobile, while utilizing the automobile's suspension system to minimize the effects of vibration and shock which occur in transit as well as during railroad coupling operations.

A further object of the invention is to provide a wheel chocking assembly which minimizes movement of an automobile aboard a railroad car in the lateral, vertical and longitudinal directions.

Still a further object of the present invention is to provide a wheel chocking assembly which will not jam in place, thus precluding its removal.

SUMMARY OF THE INVENTION

Briefly, these and other objects of the present invention are accomplished by an apparatus which is installed on the wheels along one side of an automobile and which includes a first pair of chock members, releasably mounted to the deck of the railroad car one behind the other, a second pair of chock members, releasably mounted to the deck one behind the other in a spaced relationship to the first pair of chock members, and a pair of strap members, each coupled to a respective pair of chock members and adapted to conform to the shape of the automobile's tire.

According to one embodiment of the present invention, each of the chock members is comprised of a collapsible, wedge-shaped device which is adjustably mounted between an elongated track commonly found on railroad cars used for such purposes and an additional, smaller track installed outward of the original track. While the chock members are in their collapsed state, automobiles are loaded onto the railroad car having their wheels guided by the tracks. Once an automobile is properly positioned, its wheels along one side are straddled advantageously behind and ahead by a respective pair of chock members. A webbed, polyester strap member which is adjustably coupled to the forward chock member is lead over the top of the tire and attached to the rear chock member. As so positioned, the individual chock members are locked in place by pins which extend between the track members and any slack in the strap member is taken in through the buckle means readying the automobile for transport.

In another and preferred embodiment of the invention, no center track members are required thus freeing the deck of the railroad car from obstructions and permitting unfettered loading and unloading of the automobiles. The chock members according to this embodiment of the invention are mounted on telescoping frames which are hinged within slots positioned along a channel attached to the edge of the railroad car. Stowed up and out of the way along the vertical walls of the railroad car, these chock members are swung down after the automobile is properly positioned and telescoped out to straddle the automobile's tires in a manner as described herein above. The strap member is then tightened and the automobile is ready for shipment.

Other objects, advantages and novel features of the invention will become apparent from the following detailed description of the invention when considered in conjunction with the accompanying drawings wherein:

BRIEF DESCRIPTION OF THE DRAWINGS

FIG. 1 illustrates one embodiment of the wheel chocking assembly of the present invention installed aboard a railroad car;

FIG. 2 shows in enlarged format the wheel chocking assembly of FIG. 1;

FIG. 3 is a side view of the wheel chocking assembly taken along the lines 3—3 of FIG. 2;

FIG. 3a is a detailed illustration of the wheel chocking assembly shown in FIG. 3;

DETAILED DESCRIPTION OF THE INVENTION

Figure 3B:
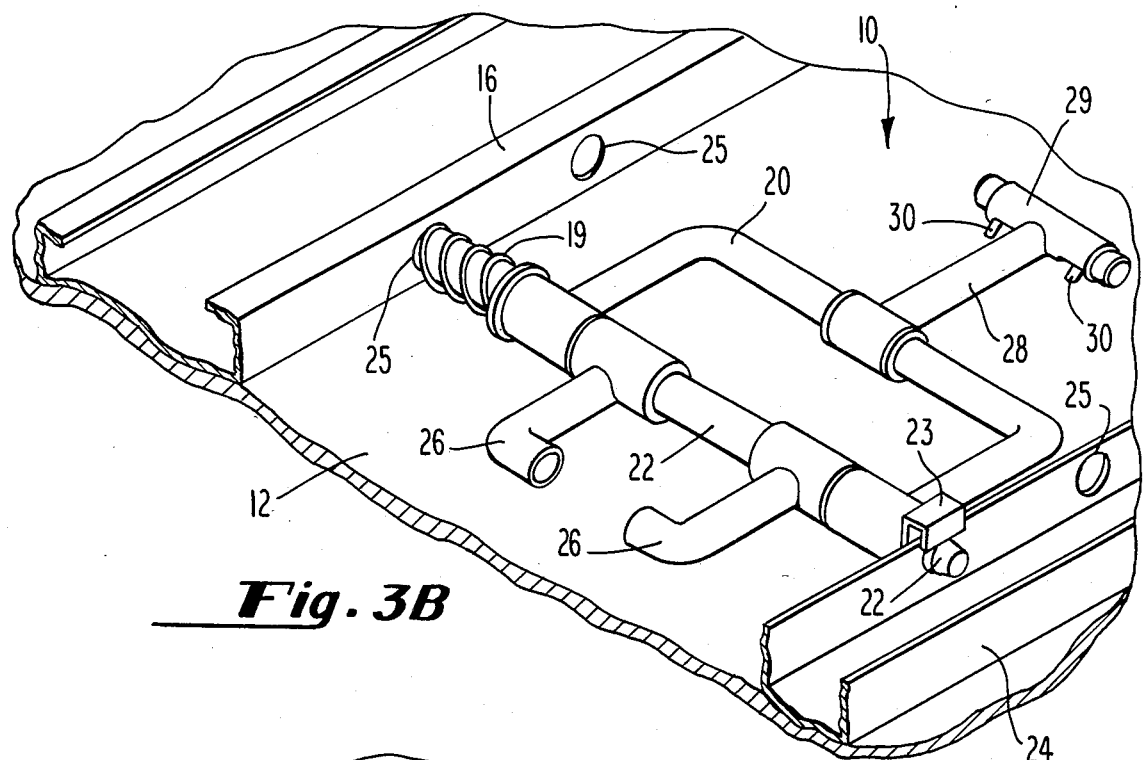
FIGS. 3b and 3c are perspective views illustrating the assembly required for the wheel chocking assembly of FIG. 1.
Figure 3C:
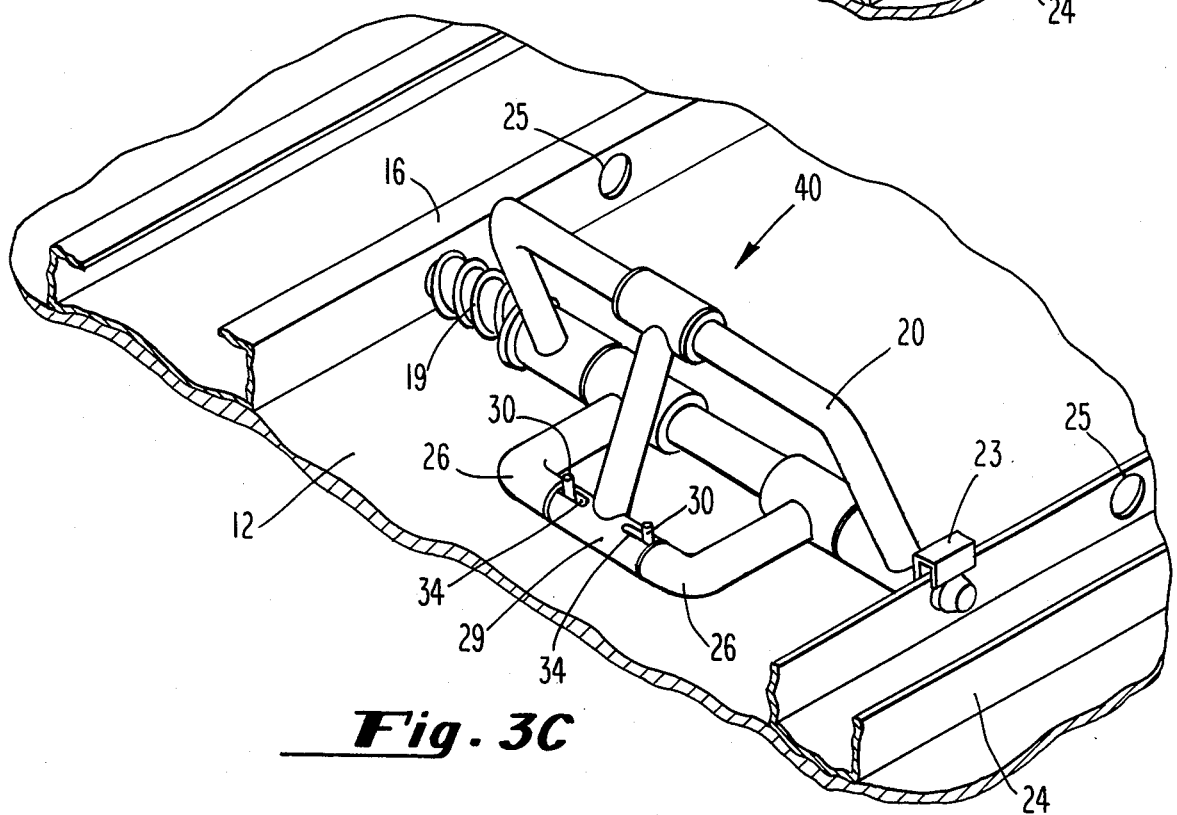

Referring now to the drawings, wherein like characters designate like or corresponding parts throughout the several views, there is shown in FIG. 1 a first embodiment of a wheel chocking assembly 10 installed aboard the deck 12 of a railroad car 14 which is typically used to transport automobiles, and which includes a conventional track 16 extending along the length of the railroad car 14 in order to guide the wheels 18 of an automobile during loading and unloading operations. While FIG. 1 shows an assembly 10 on each side of the railroad car 14 merely for convenience, it should be noted that only one side is necessary. A second outboard track 24 is also provided in accordance with this embodiment of the present invention.

As shown more clearly in FIG. 2, when viewed in conjunction with FIGS. 3, 3a, 3b and 3c, the wheel chocking assembly 10 includes a first U-shaped member 20 which is rotatably coupled at a pair of bearing surfaces 21 to a shaft 22 positioned between the track 16 and the parallel, outboard track 24. Track 16 as well as the outboard track 24 each have holes 25 drilled at regular intervals along the lengths thereof to permit adjustable placement of the shaft 22, and thus the wheel chocking assembly 10. Such adjustment may be accomplished by withdrawing a lock 23, compressing a spring 19, thus withdrawing the shaft 22 and repositioning it as necessary.

A pair of J-shaped members 26 are also coaxially and rotatably mounted at respective bearing surfaces 27 to the shaft 22 within the U-shaped member 20. In order to erect the wheel chocking assembly 10, from its collapsed state in a flat position upon the deck 12 as shown in FIG. 3b, a T-shaped member 28 having a spring-loaded foot portion 29 is rotatably mounted at the midpoint of the horizontal portion of the U-shaped member 20 at a bearing portion 31. The foot portion 29 of the T-shaped member 28 is first swung down between the pair of J-shaped members 26 thus elevating the other end of the T-shaped member 28 as well as the U-shaped member 20. So as to maintain the wheel chocking assembly 10 is this erected position shown in FIG. 3c, the foot portion 29 of the T-shaped member 28 is releasably coupled to the J-shaped members 26 as explained below. Referring now to FIG. 3a, a pair of pins 30, each of which are attached to a respective spindle 32, are retracted within a pair of slots 34 in the foot portion 29 thereby compressing a spring 36 and retracting the spindles 32 which are placed within a hollow portion 38 of the J-shaped members 26 when the spring 36 is released. Assembled in such a manner, the members 20, 26, and 28 form a wedge 40 which is advantageously positioned against the wheel 18. In order to prevent jamming of the wedge 40, the hollow portions 38 may be lined with a low-friction material such as nylon, or may alternatively be formed to provide a tapered, low friction fit of its respective spindle 32. Thereafter, a strap member 42 may be coupled between a respective pair of wedges 40 over the top the wheel 18 as described herein below.

Figure 4:
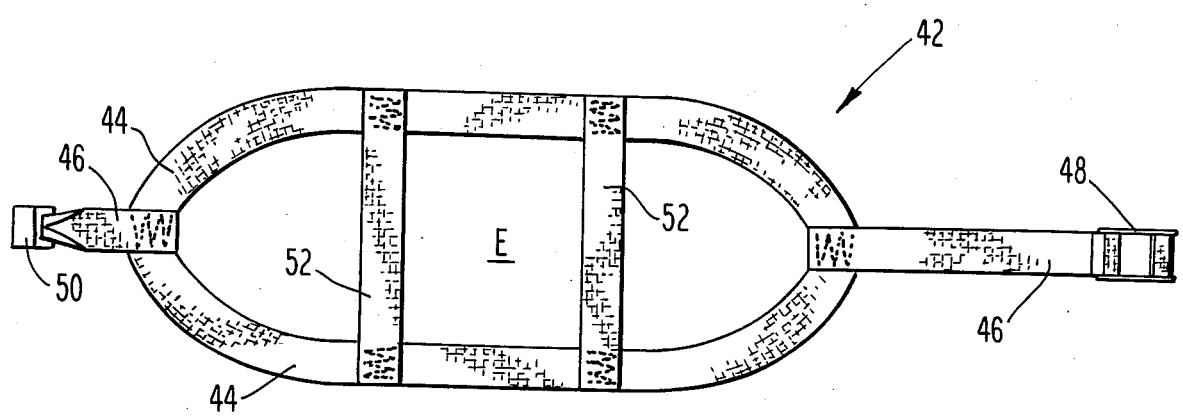
FIG. 4 illustrates a preferred embodiment of a nylon take-up strap for use in accordance with the wheel chocking assembly of the present invention.

Referring now to FIG. 4, there is shown a preferred embodiment of the strap member 42. A first pair of webbed members 44 are attached at their ends substantially in the form of an ellipse E. At opposite points of the ellipse E, along its major axis, a second pair of webbed members 46 are attached to provide a means of coupling the respective pair of wedges 40. A buckle 48, such as a conventional overcenter buckle as described in the 1985 Aeroquip Catalog 267 is attached to the distal end of one of the webbed members 46, while a clip 50 is attached to the distal end of the other webbed member 46. A third pair of webbed members 52 are attached between the first pair of webbed members 44 at points equidistant from and parallel to the minor axis of the ellipse E. Constructed thusly, the strap member 42 may be attached between a respective pair of wedges 40 which are properly positioned against the wheel 18, placed over the top of the wheel 18, and tightened securely conforming to the shape of the wheel 18 by taking up slack through the buckle 48.

In accordance with one important aspect of the invention, the wheel chocking assembly 10 must prevent lateral and vertical movement of the wheel 18 as well as preventing the movement thereof in a forward or backward direction. Prior art attempts utilizing chocks alone permit the automobile to rise out of the chock upon impacts simulating coupling operations. Impact tests performed upon the afore described embodiment of this invention, however, revealed that the wheel chocking assembly 10 including the strap member 42 was capable of withstanding an impact of approximately 13 miles per hour while substantially securing the automobile. Moreover, by utilizing a strap member 42 which conforms to the shape of the wheel 18, damage to the wheel 18 can be obviated in spite of the high tension forces which are required to adequately secure the automobile. This is unlike certain prior art approaches which have utilized either single strap or tandem wire cables in conjunction with a pair of chocks.

While the embodiment of FIGS. 1-4 has been found to be very suitable for use in protecting automobiles during transit, the channels 16 and 24 situated along the deck 12 of the railroad car 14 cause an obstruction to the high speed loading and unloading of the car 14. For this reasons the embodiment of FIGS. 5-11 is preferred. Referring now to FIGS. 5 through 8, there is shown a second and preferred embodiment of the invention which includes a pair of chocking frames 60 in conjunction with the strap member 42 to secure a wheel 18. As illustrated therein, chocking frame 60 includes a pair of support tubes 62 which are attached in a substantially parallel manner to a connecting tube 64. The connecting tube 64, when viewed in conjunction with FIGS. 7 and 8, is contained within a side channel 66 which is attached to the deck 12 of the railroad car 14. Having an inwardly-extending lip portion 70, the side channel 66 further includes a plurality of inverted T-shaped slots 72 which permit the chocking frames 60 to be locked into position upon the deck 12 or retained in an upright position moved in the direction of arrow A (FIG. 7), when not in use against the sides of the railroad car 14. Alternatively, any means such as straight-sided slots with appropriate locking means may be utilized in accordance with the present invention as long as the chocking frames 60 can be adjusted along the length of the channel 66 and hingedly coupled thereto.

Figure 5:
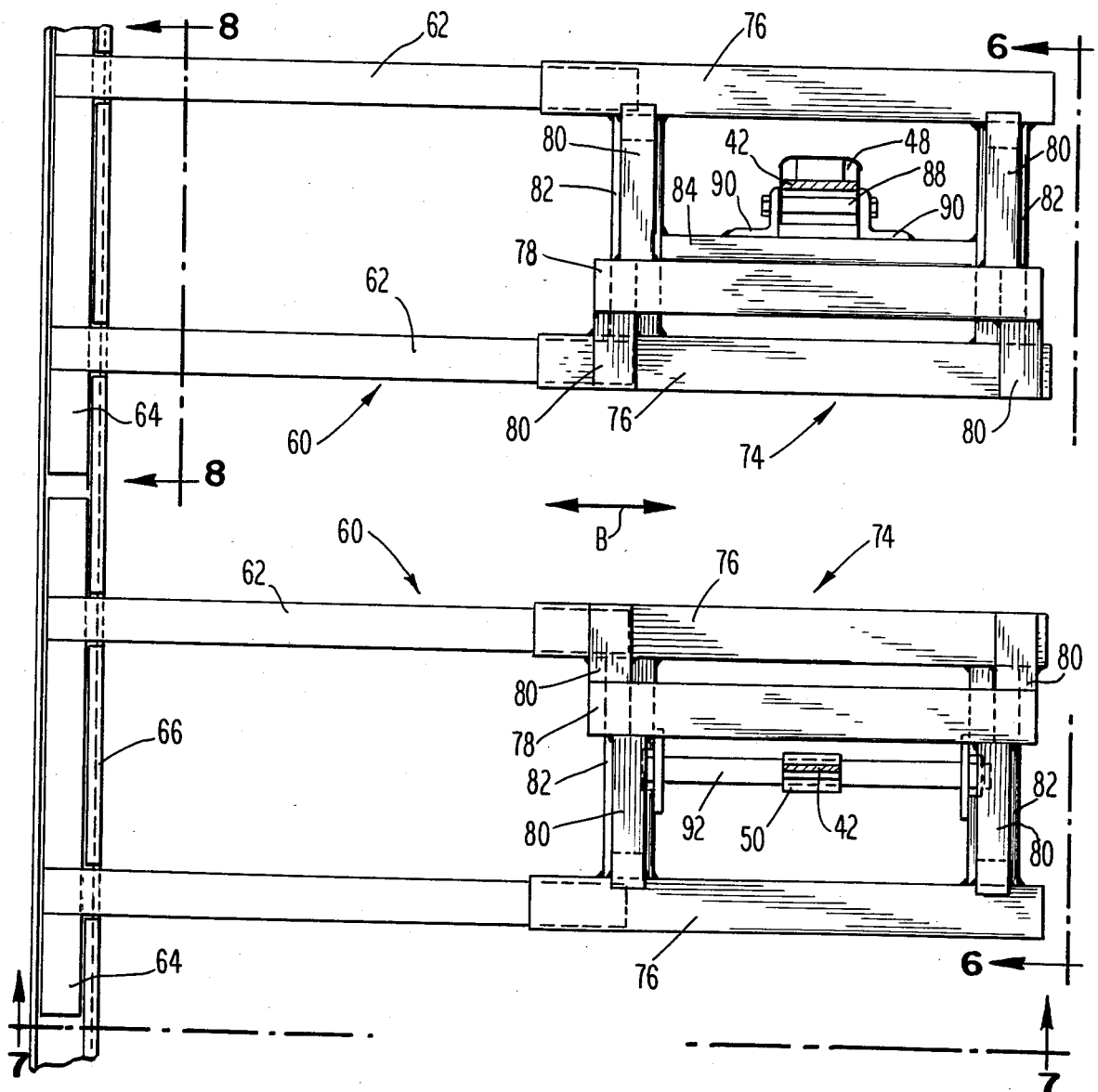
FIG. 5 shows a top view of another embodiment of the present invention.
Figure 6:
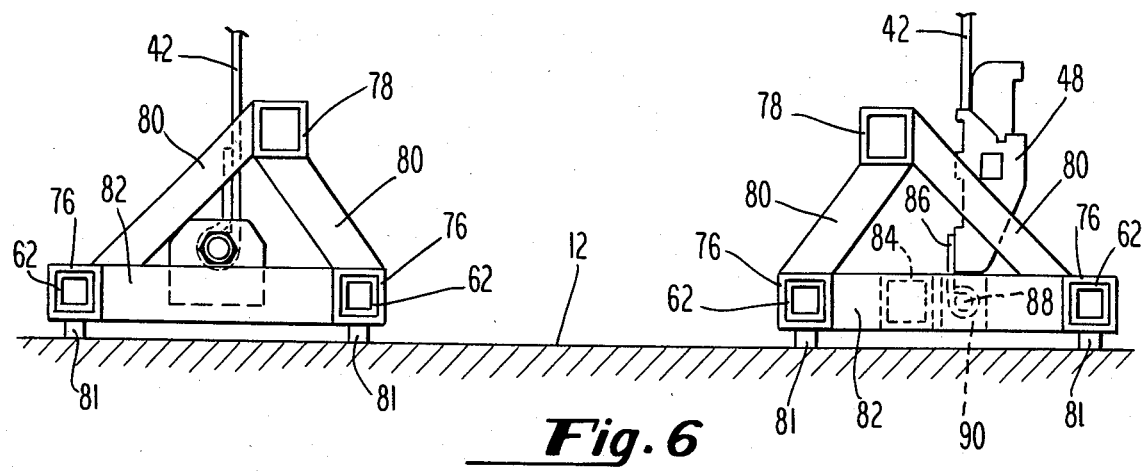
FIG. 6 illustrates the connection of the take-up strap of FIG. 4 to the embodiment of FIG. 5 as taken along the lines 6-6.
Figure 7:
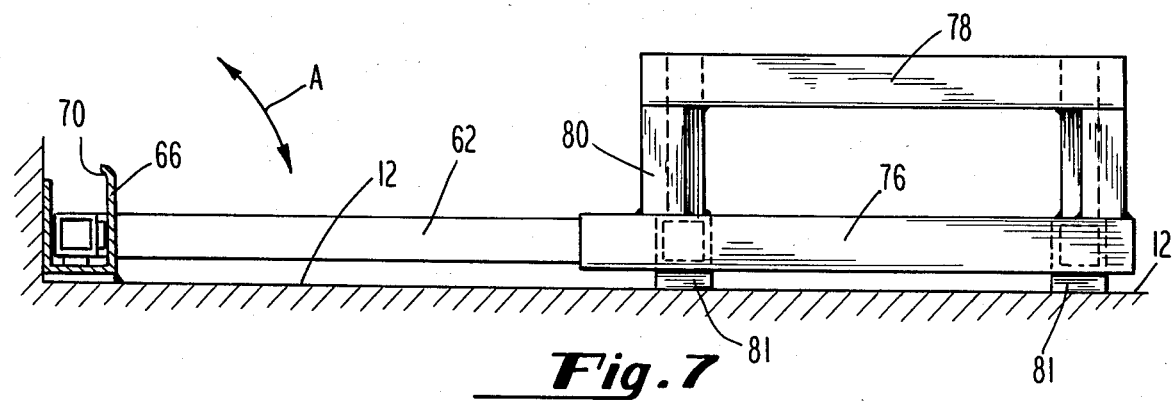
FIG. 7 is a side view of the embodiment of FIG. 5 as taken along the lines 7—7.
Figure 8:
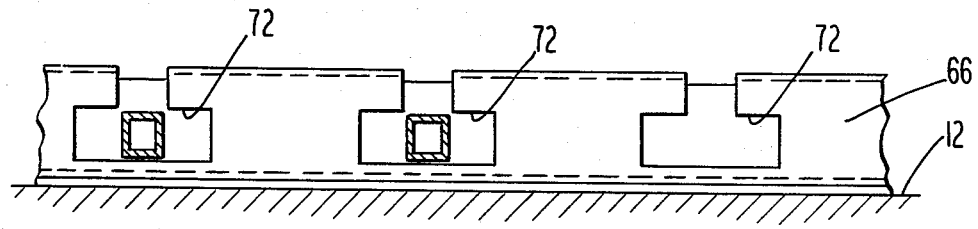
FIG. 8 illustrates the hinged arrangement of the embodiment in FIG. 5 as taken along the lines 8—8.

As shown in FIGS. 5-7, a respective wedge 74 is attached in a telescoping manner to the pair of support tubes 62. The wedges 74 are movable in the direction of arrow B (FIG. 5) toward or away from the side of the railroad car 14 by sliding along support tubes 62 in order to accommodate varying sizes of automobiles. Each wedge 74 is comprised of a pair of bottom tubes 76, each of which are slidably fit to sheath its respective support tube 62, and a top tube 78 connected by strut members 80 to the bottom tubes 76 which are maintained in parallel alignment by a pair of cross tubes 82 connected therebetween. A plurality of shim plates 81 may be attached beneath the wedge 74 in order to favorably position the wedge 74 above the deck 12.

A buckle tube 84 connects one pair of cross tubes 82 of one wedge 74 and provides a point of attachment for the buckle 48 on the strap member 42. In this embodiment, the buckle 48 is attached to a coupler 86 formed around a bolt 88 supported between a pair of angle members 90 attached to the buckle tube 84. The other wedge 74 has attached between its respective cross tubes 82 a strap bolt 92 around which the clip 50 of the strap member 42 may be attached.

Figure 9:
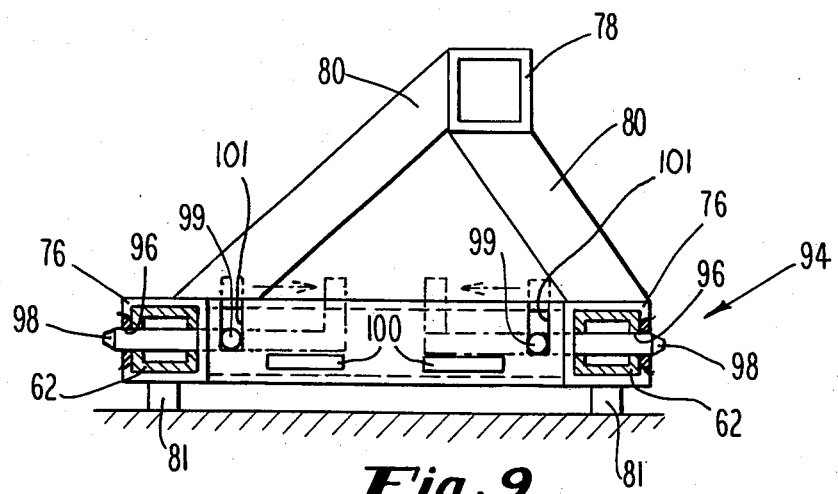
FIG. 9 illustrates a locking mechanism utilized to telescope the embodiment of FIG. 5.

The operation of a lock mechanism 94 suitable for precluding movement of the wedges 74 upon their respective support tubes 62 may now be explained with reference to FIG. 9. Each of the support tubes 62 and bottom tubes 76 have a plurality of regularly spaced holes 96 through which a pair of locking pins 98 may be inserted. In order to adjust the position of a respective pair of wedges 74 for accommodation of a varying size of automobile, the locking pins 98 each have a handle 99 which is rotated upwardly within respective slots 101 in the cross tubes 82 thereby withdrawing the pin 98 from the holes 96 as shown by the dashed arrows and permitting the distal end of the locking pins 98 to be rested upon a detent 100. When the wedge 74 has been repositioned, the locking pins 98 may be pushed from the detent 100 and fully inserted within the holes 96.

Figure 10:
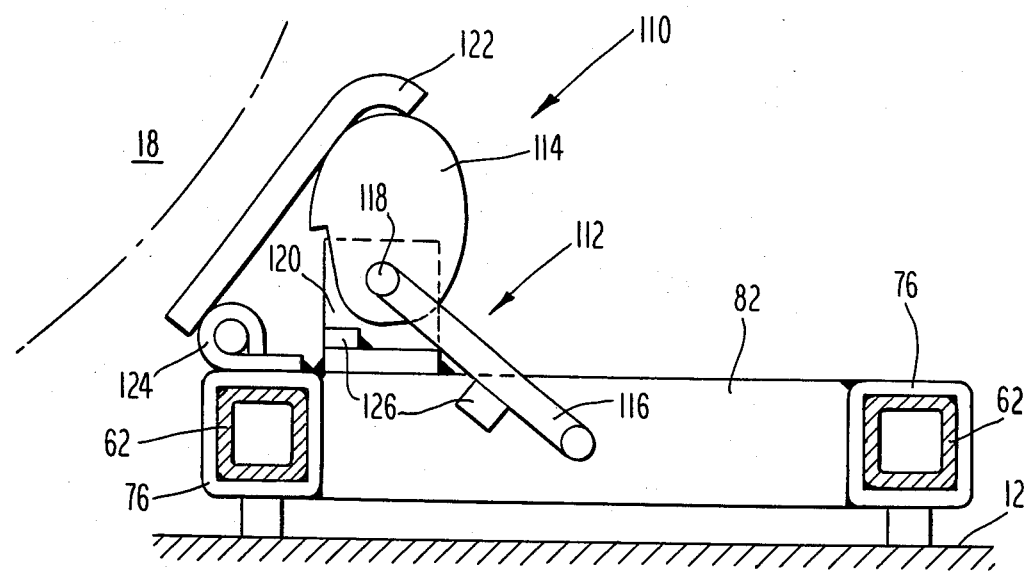
FIG. 10 shows, in an undeployed position, one embodiment of a cam-and-lever assembly according to the present invention.
Figure 11:
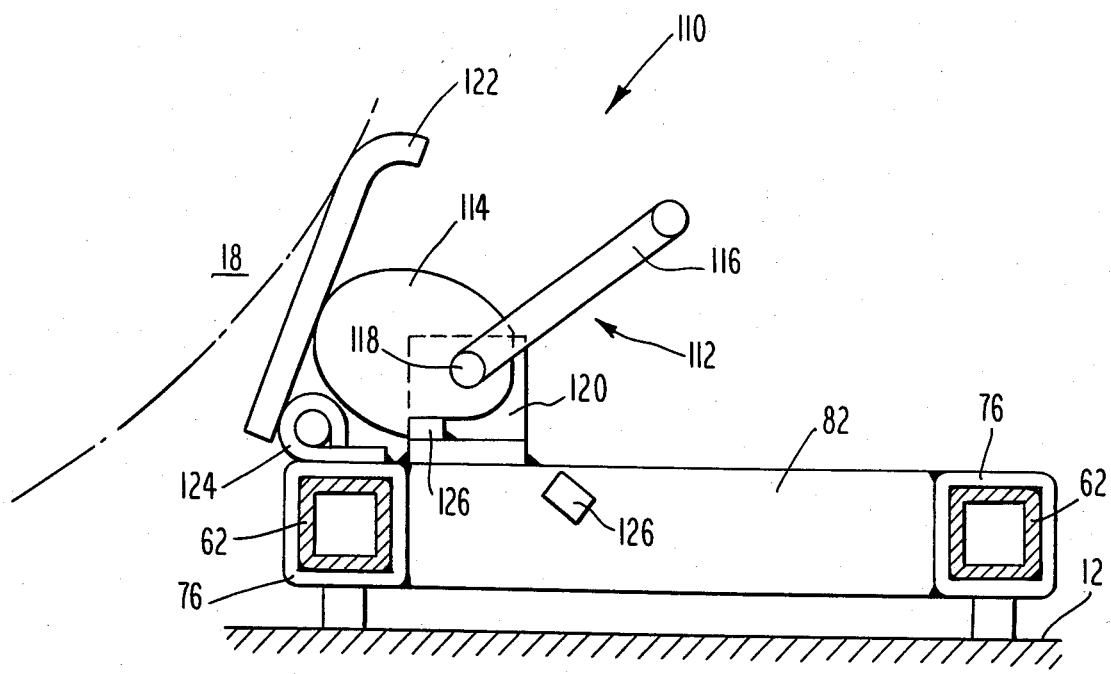
FIG. 11 shows, in a deployed position against the wheel, the cam-and-lever assembly of FIG. 10.

The problem of jamming of automobile wheels 18 against the wedge 74 such that the wedge could not be retracted and which had been encountered in prior art approaches is obviated in accordance with one important aspect of the present inventions shown in FIGS. 10 and 11, a modified wedge 110 comprised of the pair of bottom tubes 76 each slidably fit to sheath its respective support tube 62 has a cam-and-lever assembly 112 attached to the top of the cross tubes 82 to relieve those situations where the automobile's tire 18 jams the wedge 110, thus precluding its removal without tools.

A cam 114 having a lever 116 rigidly mounted thereto is rotatably mounted on shaft 118 attached between a pair of angle members 120. In its undeployed position, as shown in FIG. 10, the wedge 110 is positioned in front of the wheel 18, as previously described and the lever 116 is pulled up, thus causing the overcenter type cam 114 to lock into its deployed position as shown in FIG. 11. This action forces a faceplate 122 mounted on a hinge 124 to contact the wheel 18. If, after transport, the wheel 18 has jammed the wedge 110, pushing down on the lever 116 unlocks the cam 114 and unjams the wedge 110 by partially collapsing the faceplate 122. A pair of stops 126 limit the movement of the cam-and-lever assembly 112.

Some of the many advantages of the invention should now be readily apparent. For example, a novel wheel chocking assembly has been provided which is capable of securing an automobile to the deck of a transport such as a railroad car. The assembly is quickly positioned proximate to wheels on one side of an automobile, requiring no tools for alignment or adjustment, and safely restrains the automobile during transit as well as railroad car coupling operations. Furthermore, the assembly facilitates ready stowage to permit efficient loading and unloading of the automobiles.

Obviously many modifications and variations of the present invention are possible in light of the above teachings. It is therefore to be understood that within the scope of the appended claims the invention may be practiced otherwise and as specifically described.

What is claimed is:

1. Apparatus for securing an automobile to the deck of a transport, comprising:
   a first pair of chock members releasably and hingedly mounted upon the deck in a spaced relationship one behind the other;
   a second pair of chock members releasably and hingedly mounted upon the deck in a spaced relationship one behind the other, said second pair chock members disposed behind said first pair of chock members; and
   a pair of strap members, each coupled between a respective pair of chock members and adapted to conform to the shape of an automobile tire;
   whereby said first pair of chock members and its respective strap members engages a first wheel of the automobile and said second pair of chock members with its respective strap members engages a second wheel of the automobile, and wherein said chock members each comprise:
   a pair of parallel support tubes commonly attached perpendicularly across the deck to a connecting tube; and
   a wedge including a pair of bottom tubes which are adjustably coupled in a telescopic fashion to said support tubes.

2. Apparatus according to claim 1, wherein said wedge further comprises:
   a pair of strut tubes connected between said bottom tubes and a top tube; and
   a pair of locking pins releasably coupled each to a respective one of said support tubes within said bottom tubes.

3. Apparatus according to claim 1, further comprising:
   a side channel attached along the side of the deck; said side channel including a plurality of inverted T-shaped slots within which said connecting tube and said support tubes are couple in a hinged fashion.

4. Apparatus according to claim 1, wherein said chock members further comprise:
   an overcenter cam; and
   a lever attached to said overcenter cam for collapsing said wedge to alleviate jamming thereof.

5. A wheel chocking assembly for securing an automobile to the deck of a railroad car comprising:
   a channel attached to and extending along the length of the railroad car deck at one side thereof;
   at least two pair of support tubes, each of said pairs of support tubes being releasably attached to said channel at various positions along the length thereof and when attached being hingedly coupled to said channel for movement from an engaged position upon the deck to a disengaged position at which said tubes provide substantially no obstruction to the entry and exit of automobiles to or from the railroad car;
   at least two wedges, each of which is telescopically mounted to a respective pair of said support tubes; and at least one strap member adapted to conform to the shape of a wheel, extending over the top thereof, and coupled at its ends to each pair of wedges.

6. A wheel chocking assembly according to claim 5 wherein said wedges are collapsible.

7. A wheel chocking assembly according to claim 5 further comprising:

means for locking said wedges in a preselected position along said support tube for adapting the assembly to a variety of automobile sizes.

8. A wheel chocking assembly according to claim 6, wherein said collapsible wedges further comprise:

faceplate adapted to extend across the width of the automobile's tires hingedly couple to said support tubes; and cam means coupled to said faceplate for rotating said faceplate away form the automobile's wheels when they become jammed thereon.

9. A wheel chocking assembly according to claim 8, wherein said cam means comprises:

an overcenter cam;

a lever attached to said overcenter cam for rotating said overcenter cam into and out of an engaged position; and a pair of stops adapted to limit the movement of said lever within an arc corresponding to said overcenter cam's engaged position.

* * * * *